United States Patent
Sasaki

(10) Patent No.: US 6,647,312 B2
(45) Date of Patent: Nov. 11, 2003

(54) ADAPTIVE CONTROL METHODS AND APPARATUS USING FREQUENCY ANALYSIS OF TIME SERIES DATA

(75) Inventor: Takashi Sasaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 261 days.

(21) Appl. No.: 09/906,559

(22) Filed: Jul. 16, 2001

(65) Prior Publication Data

US 2002/0096296 A1 Jul. 25, 2002

(30) Foreign Application Priority Data

Aug. 30, 2000 (JP) ........................................ 2000-261071

(51) Int. Cl.[7] ............................ G05B 13/02; D21F 11/00
(52) U.S. Cl. .......................... 700/128; 700/28; 700/129; 162/198; 162/262
(58) Field of Search .............................. 700/28, 32, 34, 700/54, 55, 71, 122, 127–129; 162/198, 238, 239, 252, 262

(56) References Cited

U.S. PATENT DOCUMENTS

| | | | | |
|---|---|---|---|---|
| 3,617,717 A | * | 11/1971 | Smith ............................ 700/8 |
| 3,794,817 A | * | 2/1974 | Shinskey ...................... 700/72 |
| 3,798,426 A | * | 3/1974 | Bristol, II .................... 700/38 |
| 5,400,247 A | * | 3/1995 | He ............................... 700/53 |
| 6,026,334 A | * | 2/2000 | Kayihan et al. .............. 700/28 |

* cited by examiner

Primary Examiner—Albert W. Paladini
Assistant Examiner—Paul Rodriguez
(74) Attorney, Agent, or Firm—Moonray Kojima

(57) ABSTRACT

The present invention provides a method for controlling a process by calculating a manipulated variable from a deviation between setpoint and control output variables and then using the manipulated variable, wherein the time-series data of the control output variable is subjected to a frequency analysis, the rate of change in the frequency response amplitude of the control output variable in relation to a control gain ratio is determined, and a control gain is adjusted according to the rate of change and the results of the frequency analysis.

With this adaptive control method and apparatus for the method, it is possible to automatically set a control gain according to the condition of disturbance. As a result, optimum control can always be achieved and follow-up capability can be improved for such events as a setpoint change.

22 Claims, 8 Drawing Sheets

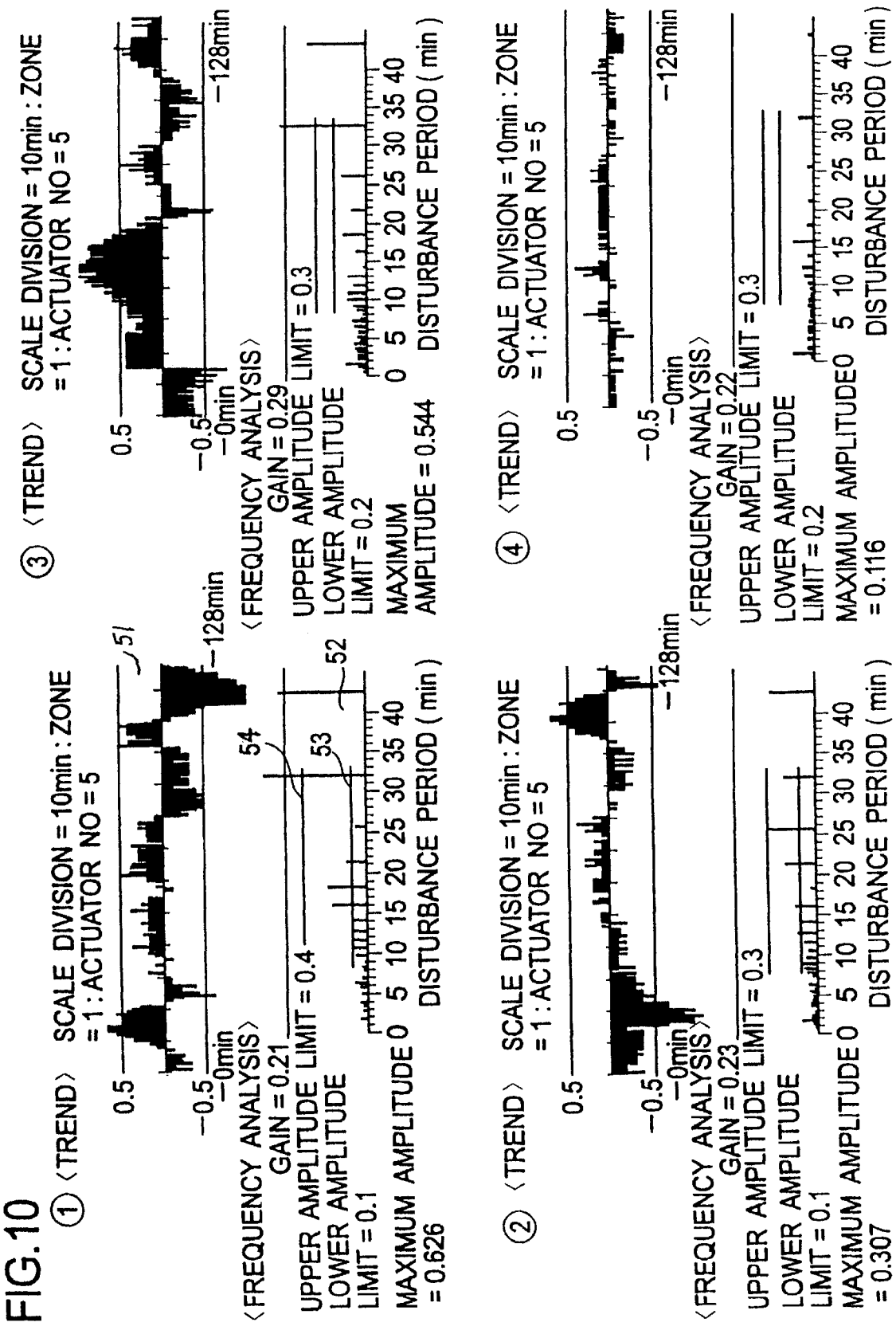

ADAPTIVE CONTROL METHODS AND APPARATUS USING FREQUENCY ANALYSIS OF TIME SERIES DATA

BACKGROUND OF THE INVENTION

1. Field of the Invention

The present invention relates to adaptive control methods and apparatus for automatically optimizing a control gain. More particularly, the invention relates to adaptive control methods and apparatus preferred in controlling cross-machine direction profiles in a paper machine.

The effect of feedback control varies greatly, depending on a combination of the period of a disturbance present in a process and a control gain. In other words, there are two types of disturbance, one of which has such a period as to enable the disturbance to be attenuated by feedback control and the other has such a period as to cause the disturbance to be amplified instead as the result of feedback control.

Conventionally, the tuning of control gains has been achieved by trial and error in the field, while observing controllability against cyclic disturbances present in a process. This conventional tuning method has been problematic, however. If a control gain is decreased in an attempt to prevent the amplitude of a short-period disturbance from increasing as the result of control, controllability against long-period disturbances or follow-up capability for setpoint changes will deteriorate. It is therefore desirable that the control gain be increased as much as possible within the given tolerance limits. On the other hand, it is difficult to search for the magnitude of control gain that gives the optimum balance.

Another problem is that the period and/or amplitude of disturbance present in a process varies with the state thereof. The interval of such variation is wide-ranging, from several hours to a few days, or even to a few months. This means that the control gain that is optimum at some point in time may be improper several hours or several days later. Consequently, controllability would deteriorate and in some cases the control gain must be re-tuned.

A general object of the present invention, therefore, is to provide adaptive control methods and apparatus whereby a control gain can be automatically optimized online.

2. Description of the Prior Art

FIG. 1 is a diagrammatic view showing the configuration of a paper machine. In the figure, produced paper 61 is smoothed in its entirety and tuned in its thickness profile by a calender 62, and wound onto a reel 64. A sensor 63 is placed immediately before the reel 64 to measure the moisture percentage and/or thickness of the produced paper 61. A measurement signal detected by the sensor 63 is then input to a measurement computation unit 65, where the profile of the signal is calculated. This profile is then input to the control unit 66. The control unit 66 controls the paper machine according to the profile.

The sensor 63 scans the paper 61 in the cross-machine direction (from this side to the far side of the paper in the figure) to measure the moisture percentage and/or thickness. Since there are as many as 1200 measurement points in the cross-machine direction, the width of the paper is divided into multiple zones and the measured value of the midpoint of each zone is defined as the representative data point of that zone.

FIG. 2 is a schematic view showing the relationship between zones and measurement points. In FIG. 2, a numeral 71 indicates the way paper 61 is cut into rectangular slices and thus divided into N zones. A numeral 72 indicates the correspondence of these zones with measurement points. A plurality of measurement points are included in each zone (zone i), and the midpoint PC(i) among the plurality of measurement points is defined as the representative data point of that zone.

FIG. 3 is a block diagram showing the configuration of a system for controlling cross-machine direction profiles in a paper machine. In the figure, a setpoint variable R(s) and a control output variable C(s) (e.g., the measured value of paper thickness) of profile control are input to a calculation unit 81, where a deviation variable E(s) which is a difference between the setpoint and control output variables is calculated. The deviation variable E(s) is input to a controller 82 of finite settling-time response control type for calculation and output of a manipulated variable W(s). The manipulated variable W(s) is input through a hold unit 83 to a process 84 that can be approximated using a dead time and a first-order delay. Consequently, the process 84 is placed under feedback control.

A symbol V(s) denotes cyclic disturbance present in the process 84. Such cyclic disturbance includes interference due to a concentration or liquid level change in a system for blending various types of raw material or interference arising in the form of cyclic variations in the measurement signal of moisture percentage or paper thickness caused by an eccentricity in a rapidly rotating wire or roll. These cyclic disturbances have two types of period, one of which enables the disturbance to be attenuated by feedback control and the other causes the disturbance to be amplified instead as the result of feedback control.

Now the method of controlling a paper machine is described with reference to FIG. 3. The transfer functions of the hold unit 83 and process 84 that can be approximated using a dead time and a first-order delay are represented by equations (1) and (2) below:

Transfer function of hold unit 83

$$H(s) = \frac{1 - e^{-Ts}}{s} \tag{1}$$

Transfer function of process 84

$$P(s) = \frac{Ke^{-Ls}}{1 + T_0 s} \tag{2}$$

where
K=Process gain
T=Sampling interval
$T_0$=Time constant
L=Dead time (L=mT, where m is 0 or a natural number).
Assuming HP(s)=H(s)P(s), then $$HP(s)G(s)(-C(s))+V(s)=C(s)$$

holds true from FIG. 3. Changing this equation gives $$V(s) = (1 + HP(s)G(s)) \cdot C(s)$$

From this equation, the control output C(s) is determined as $$C(s) = \frac{1}{1 + HP(s)G(s)} V(s) \quad (3)$$

Z-transforming equation (3) results in equation (4) below.

$$C(z) = \frac{1}{1 + HP(z)G(z)} V(z) \quad (4)$$

From equations (1) and (2) noted above, z-transforming HP(s) gives equation (5) below.

$$HP(z) = \left[\frac{1 - e^{-Ts}}{s} \cdot \frac{Ke^{-Ls}}{1 + T_0 s}\right] = K(1 - z^{-1})z^{-m} \cdot Z\left[\frac{1}{s(1 + T_0 s)}\right] \quad (5)$$

$$= K(1 - z^{-1})z^{-m} \cdot Z\left[\frac{1}{s} - \frac{1}{s + T_0^{-1}}\right] = K(1 - z^{-1})z^{-m}\left(\frac{1}{1 - z^{-1}} - \frac{1}{1 - e^{-T/T_0}z^{-1}}\right)$$

$$= \frac{K(1 - \alpha)z^{-(m+1)}}{1 - \alpha z^{-1}}$$

where $\alpha = e^{-T/T_0}$.

The transfer function G(z) of a controller of finite settling-time response control type is given by equation (6) below:

$$G(z) = \frac{1}{K^*(1 - \alpha^k)} \frac{(1 - \alpha^k z^{-k})(1 - \alpha z^{-1})}{(1 - \alpha z^{-1}) - \frac{(1 - \alpha)}{(1 - \alpha^k)} z^{-(m+1)}(1 - \alpha^k z^{-k})} \quad (6)$$

where K* denotes a control gain.

Now let us define a symbol g as g=K/K* (g>0) and refer to g as a control gain ratio. From equations (5) and (6), we obtain equation (7) below:

Assuming a cyclic disturbance is $$v(z) = e^{j\omega t}$$

and then z-transforming this equation gives $$V(z) = Z(v(t)) = \frac{1}{1 - z^{-1}e^{j\omega T}} \quad (8)$$

where ω is the angular frequency of the cyclic disturbance. If we define a frequency transfer function $\Phi_g(z)$ as $$\Phi_g(z) = \frac{1}{1 + HP(z)G(z)} \quad (9)$$

then $$C(z) = \Phi_g(z)V(z)$$

is derived from equation (4) above.

From equations (7) and (9), we obtain $$\Phi_g(z) = \frac{A(z) - B(z)}{A(z) + (g - 1)B(z)} \quad (10)$$

where $$A(z) = 1 - \alpha z^{-1} \quad (11)$$

$$B(z) = \frac{(1 - \alpha)}{(1 - \alpha^k)} z^{-(m+1)}(1 - \alpha^k z^{-k}) \quad (12)$$

If we square the absolute value of equation (10), we obtain $$1 + HP(z)G(z) = 1 + \frac{K(1-\alpha)z^{-(m+1)}}{1 - \alpha z^{-1}} \frac{1}{K^*(1-\alpha^k)} \frac{(1 - \alpha z^{-1})(1 - \alpha^k z^{-k})}{(1 - \alpha z^{-1}) - \frac{(1-\alpha)}{(1-\alpha^k)} z^{-(m+1)}(1 - \alpha^k z^{-k})} \quad (7)$$

$$= 1 + \frac{g(1-\alpha)z^{-(m+1)}(1 - \alpha^k z^{-k})}{(1 - \alpha^k)\left\{(1 - \alpha z^{-1}) - \frac{(1-\alpha)}{(1-\alpha^k)} z^{-(m+1)}(1 - \alpha^k z^{-k})\right\}}$$

$$= \frac{(1 - \alpha z^{-1}) - \frac{(1-\alpha)}{(1-\alpha^k)} z^{-(m+1)}(1 - \alpha^k z^{-k}) + g \frac{(1-\alpha)}{(1-\alpha^k)} z^{-(m+1)}(1 - \alpha^k z^{-k})}{(1 - \alpha z^{-1}) - \frac{(1-\alpha)}{(1-\alpha^k)} z^{-(m+1)}(1 - \alpha^k z^{-k})}$$

$$= \frac{(1 - \alpha z^{-1}) + (g - 1)\frac{(1-\alpha)}{(1-\alpha^k)} z^{-(m+1)}(1 - \alpha^k z^{-k})}{(1 - \alpha z^{-1}) - \frac{(1-\alpha)}{(1-\alpha^k)} z^{-(m+1)}(1 - \alpha^k z^{-k})}$$

$$|\Phi_g(z)|^2 = \frac{A(z) - B(z)}{A(z) + (g-1)B(z)} \frac{\overline{A(z)} - \overline{B(z)}}{\overline{A(z)} + (g-1)\overline{B(z)}} \quad (13)$$

$$= \frac{|A(z)|^2 - (B(z)\overline{A(z)} + A(z)\overline{B(z)}) + |B(z)|^2}{|A(z)|^2 + (g-1)(B(z)\overline{A(z)} + A(z)\overline{B(z)}) + (g-1)^2|B(z)|^2}$$

$$= \frac{|A(z)|^2 - 2\{\text{Re}(A(z))\text{Re}(B(z)) + \text{Im}(A(z))\text{Im}(B(z))\} + |B(z)|^2}{|A(z)|^2 + 2(g-1)\{\text{Re}(A(z))\text{Re}(B(z)) + \text{Im}(A(z))\text{Im}(B(z))\} + (g-1)^2|B(z)|^2}$$

Now let us assume that the cyclic disturbance defined by equation (8) is input to the system of FIG. 3. Then, the control output C(s) in a steady state is calculated as shown below from the final-value theorem.

$$\lim_{t \to \infty}\left(\frac{c(t)}{e^{j\omega t}}\right) = \lim_{z \to 1}\left((1-z^{-1})Z\left[\frac{c(t)}{e^{j\omega t}}\right]\right) = \lim_{z \to 1}((1-z^{-1})C(e^{j\omega T}z))$$

$$= \lim_{z \to 1}((1-z^{-1})\Phi_g(e^{j\omega t}z)V(e^{j\omega t}z))$$

$$= \lim_{z \to 1}\left((1-z^{-1})\frac{1}{1-e^{j\omega t}(e^{j\omega t}z)^{-1}} \cdot \Phi_g(e^{j\omega t}z)\right)$$

$$= \lim_{z \to 1}\Phi_g(e^{j\omega t}z) = \Phi_g(e^{j\omega t})$$

This is because $$Z(e^{-\alpha t}f(t)) = f(0) + e^{-\alpha t}f(T)z^{-1} + e^{-2\alpha t}f(2T)z^{-2} + \ldots +$$
$$e^{-n\alpha t}f(nT)z^{-n} + \ldots$$
$$= f(0) + f(T)(e^{-\alpha t}z)^{-1} + f(2T)(e^{-\alpha t}z)^{-2} + \ldots +$$
$$e^{-n\alpha t}f(nT)(e^{-\alpha t}z)^{-n} + \ldots$$
$$= F(e^{\alpha t}z)$$

holds true in general, and therefore $$Z(e^{-\alpha t}f(t)) = F(e^{\alpha t} \cdot z), \quad (F(z) = Z(f(t)))$$

also holds true.

Consequently, the amplitude of the control output C(s), i.e., the amplitude of a frequency response, is given by the absolute value of the frequency transfer function, as shown below.

$$|\Phi_g(e^{j\omega T})|$$

To find the value of $|\Phi_g(e^{j\omega T})|$, the terms $\text{Re}(A(e^{j\omega T}))$, $\text{Im}(A(e^{j\omega T}))$, $\text{Re}(B(e^{j\omega T}))$ and $\text{Im}(B(e^{j\omega T}))$ must be calculated from equations (11) and (12), and then the calculations substituted into equation (13).

Since $$A(e^{j\omega T}) = 1 - \alpha e^{-j\omega T} = 1 - \alpha\{\cos(\omega T) - j\sin(\omega T)\}$$

from equation (11), we obtain $$\text{Re}(A(e^{j\omega T})) = 1 - \alpha\cos(\omega T) \quad (14)$$

$$\text{Im}(A(e^{j\omega T})) = \alpha\sin(\omega T) \quad (15)$$

Since $$B(e^{j\omega T}) = \frac{(1-\alpha)}{(1-\alpha^k)}e^{-j(m+1)\omega T}(1 - \alpha^k e^{-jk\omega T})$$

$$= \frac{(1-\alpha)}{(1-\alpha^k)}[\{\cos((m+1)\omega T) - j\sin((m+1)\omega T)\}[1 - \alpha^k\{\cos(k\omega T) - j\sin(k\omega T)\}]$$

$$= \frac{(1-\alpha)}{(1-\alpha^k)}[\{\cos((m+1)\omega T)(1 - \alpha^k\cos(k\omega T)) + \alpha^k\sin((m+1)\omega T)\sin(k\omega T)\} + j\{\alpha^k\cos((m+1)\omega T)\sin(k\omega T) - \sin((m+1)\omega T)(1 - \alpha^k\cos(k\omega T))\}]$$

$$= \frac{(1-\alpha)}{(1-\alpha^k)}[\{\cos((m+1)\omega T) - \alpha^k\cos((k+m+1)\omega T)\} + j\{-\sin((m+1)\omega T) + \alpha^k\sin((k+m+1)\omega T)\}]$$

also holds true from equation (12), we obtain $$\text{Re}(B(e^{j\omega T})) = \frac{(1-\alpha)}{(1-\alpha^k)}\{\cos((m+1)\omega T) - \alpha^k\cos((k+m+1)\omega T)\} \quad (16)$$

$$\text{Im}(B(e^{j\omega T})) = \frac{(1-\alpha)}{(1-\alpha^k)}\{-\sin((m+1)\omega T) + \alpha^k\sin((k+m+1)\omega T)\} \quad (17)$$

By substituting equations (14) to (17) into equation (13), we can find the value of $$|\Phi_g(e^{j\omega T})|$$

which is the absolute value of the frequency transfer function, i.e., the amplitude of a frequency response.

FIG. 4 is the result of calculating the amplitude of frequency response $|\Phi_g(e^{j\omega T})|$ in a case when the control gain ratio g is used as the parameter and the value thereof is varied from 1.0 to 0.2 in units of 0.2, thereby increasing the control gain K* on a step-by-step basis. In the figure, the horizontal axis represents the period of cyclic disturbance and the vertical axis represents the amplitude of frequency response $|\Phi_g(e^{j\omega T})|$. In this case, we assume that the dead time=300 sec, time constant=480 sec, sampling time=30 sec, control gain $K^*=1/g$, k=10, and settling time=$(k+m)T=600$ sec.

In FIG. 4, periods of disturbance in which the amplitude of frequency response $|\Phi_g(e^{j\omega T})|$ is smaller than 1 mean that the amplitude decreases as the result of feedback control. Conversely, periods of disturbance in which the amplitude of frequency response $|\Phi_g(e^{j\omega T})|$ is greater than 1 mean that the amplitude increases as the result of feedback control.

For example, if g=1.0, the amplitude of cyclic disturbance with a period of 15 minutes increases by a factor of 1.8. If g=0.4, i.e., the control gain is made 2.5 times larger, then the amplitude increases only by a factor of 1.2 at the most. Since the amplitude $|\Phi_g(e^{j\omega T})|$ of cyclic disturbance with that period is greater than 1.0, system performance will never be improved no matter how much the control gain is increased. This is a limitation of feedback control.

On the other hand, if g=1.0, cyclic disturbance with a period of 100 minutes is attenuated down to half. Feedback control thus exerts its effect. If g=0.4, however, the disturbance is attenuated only by a factor of 0.9. Thus, system performance improvements by feedback control can hardly be expected. Accordingly, it is now understood that the effect of feedback control greatly varies depending on the combination of the period of presence of a disturbance and a control gain.

SUMMARY OF THE INVENTION

The present invention provides a method for controlling a process by calculating a manipulated variable from a deviation between setpoint and control output variables and then using the manipulated variable, wherein the time-series data of the control output variable is subjected to a frequency analysis, the rate of change in the frequency response amplitude of the control output variable in relation to a control gain ratio is determined, and a control gain is adjusted according to the rate of change and the results of the frequency analysis. As a result, it is possible to automatically set a control gain according to the condition of disturbance. Thus, optimum control can always be achieved and follow-up capability can be improved for such events as a setpoint change.

BRIEF DESCRIPTION OF THE DRAWINGS

FIG. 10 is a graphical view for explaining the advantageous effects of the present invention.

DETAILED DESCRIPTION OF THE PREFERRED EMBODIMENTS

Now, embodiments of the present invention are described in detail with reference to the accompanying drawings.

Firstly, an examination will be made of the rate of change in the square of the frequency transfer function $|\Phi_g(e^{j\omega T})|$ represented by equation (13) noted earlier, using the control gain g as the parameter.

Assuming, $$|\Phi_g(e^{j\omega T})|^2 = \frac{f_2}{f_1(g)} \quad (18)$$

we obtain $$\frac{\partial |\Phi_g(e^{j\omega T})|^2}{\partial g} = \frac{f_2}{f_1(g)} \frac{\partial f_1(g)}{\partial g} = -|\Phi_g(e^{j\omega T})|^2 \frac{\partial f_1(g)}{\partial g}$$

Note that the following equations hold true here.

$$f_2 = |A(e^{j\omega T})|^2 - 2\{Re(A(e^{j\omega T}))Re(B(e^{j\omega T})) + Im(A(e^{j\omega T}))Im(B(e^{j\omega T}))\} + |B(e^{j\omega T})|^2$$

$$f_1(g) = |A(e^{j\omega T})|^2 + 2(g-1)\{Re(A(e^{j\omega T}))Re(B(e^{j\omega T})) + Im(A(e^{j\omega T}))Im(B(e^{j\omega T}))\} + (g-1)^2|B(e^{j\omega T})|^2$$

$$\frac{\partial f_1(g)}{\partial c} = 2\{Re(A(e^{j\omega T}))Re(B(e^{j\omega T})) + Im(A(e^{j\omega T}))Im(B(e^{j\omega T}))\} + 2(g-1)|B(e^{j\omega T})|^2$$

From equation (18), the sign of the term $$\frac{\partial |\Phi_g(e^{j\omega T})|^2}{\partial g}$$

agrees with that of the term $$-\frac{\partial f_1(g)}{\partial g}$$

Figure 4:
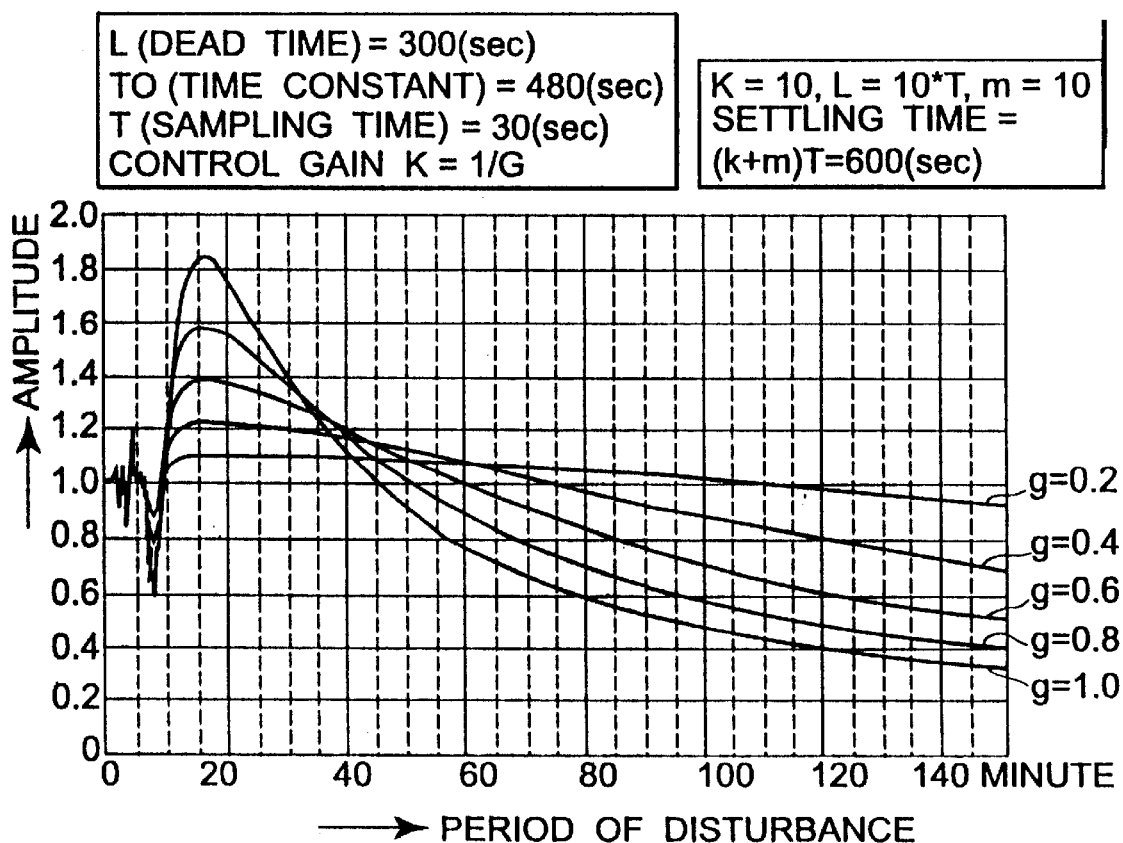
FIG. 4 is a graph showing the relationship between the period of disturbance and the amplitude of frequency response.
Figure 9:
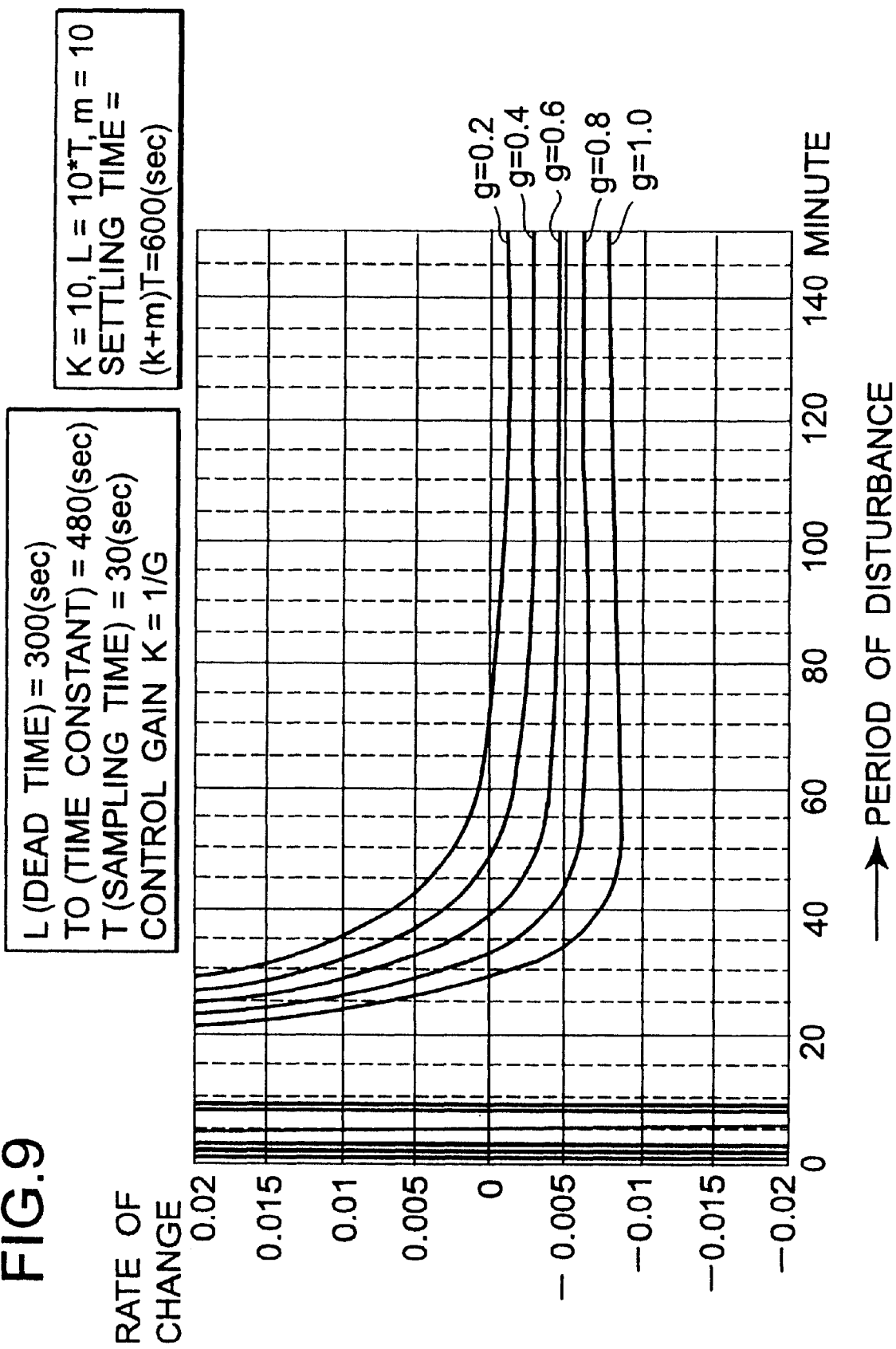
FIG. 9 is a graph showing the relationship between period and the rate of change of disturbance.

FIG. 9 is a graph where the control gain ratio g is used as the parameter, and the period of disturbance and the rate of change $$-\frac{\partial f_1(g)}{\partial g}$$

are plotted on the horizontal and vertical axes, respectively. Like in the case of FIG. 4, we assume here that the dead time=300 sec, time constant=480 sec, sampling time=30 sec, control gain $K^*=1/g$, k=10, and m=10. As is known from this figure, the sign of $$-\frac{\partial f_1(g)}{\partial g}$$

reverses at and beyond the period of disturbance of 40 minutes for a control gain ratio of, for example, g=0.6.

This indicates that if g=0.6, i.e., the control gain $K^*=1/0.6=1.67$, the amplitude of frequency response decreases for disturbances with a period longer than 40 minutes when the control gain ratio g is increased (or the control gain K* is decreased). In contrast, the amplitude of frequency response decreases for disturbances with a period shorter than 40 minutes when the control gain ratio g is decreased (or the control gain K* is increased). The boundary at which the sign reverses changes depending on the control gain ratio g. For example, in a case where g=0.4 (control gain K*=2.50), the boundary exists at a point where the disturbance period is 50 minutes.

Accordingly, examining the sign of $$\frac{\partial |\Phi_g(e^{j\omega T})|^2}{\partial g}$$

makes it possible to predict how to set the control gain K*. Hereinafter, an explanation will be made of a method for setting the control gain K* and a system for the method.

Figure 5:
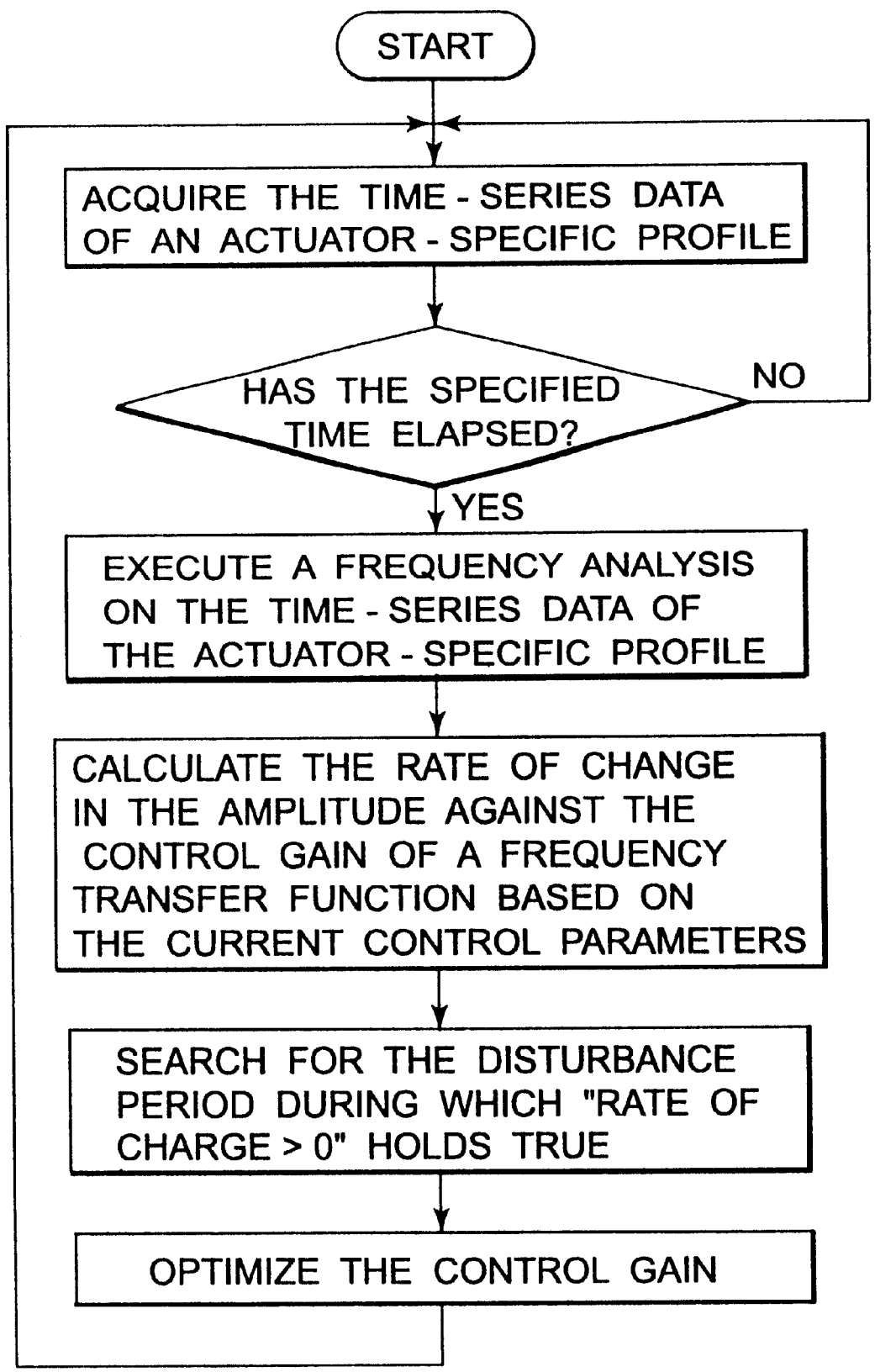
FIG. 5 is a flowchart for explaining the behavior of the adaptive control method according to the present invention.

FIG. 5 is a flowchart showing one embodiment of the adaptive control method applied to a paper machine according to the present invention. This flow of control is carried out for each scan (each one-way travel of a caliper sensor at an interval of, e.g., 30 seconds).

Figure 1:
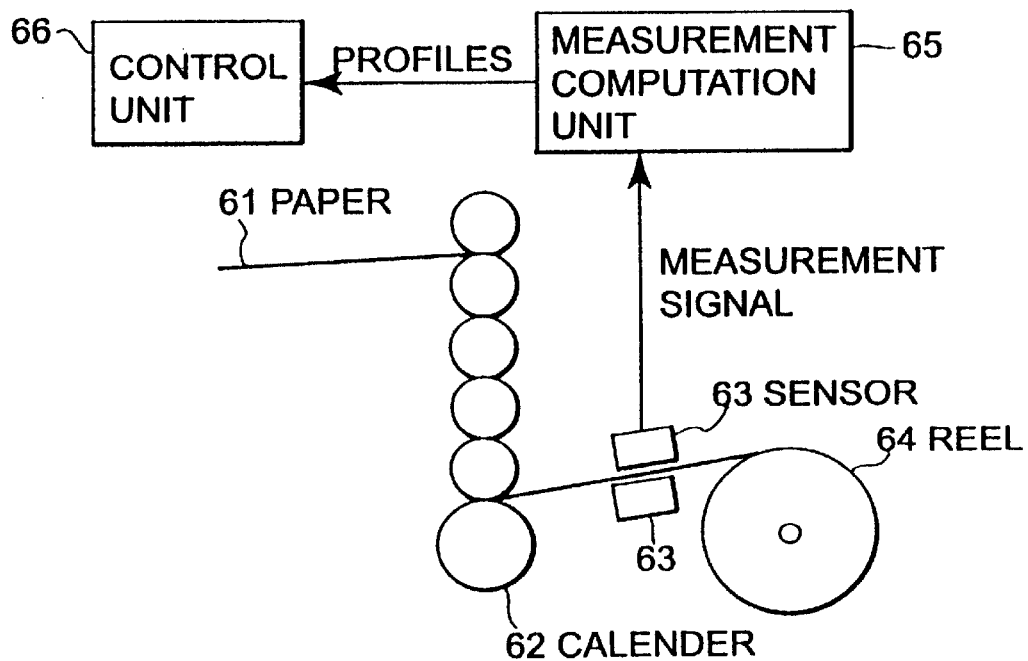
FIG. 1 is a diagrammatic view showing the configuration of a paper machine.
Figure 2:
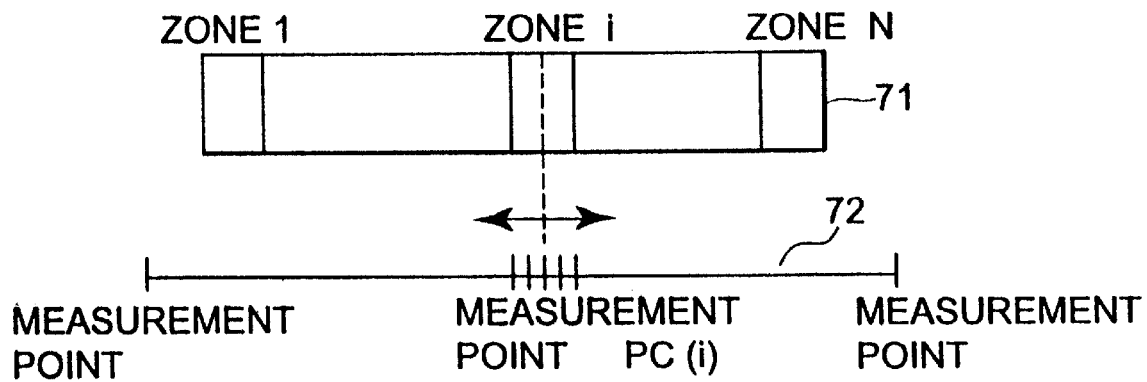
FIG. 2 is a schematic view showing how the width of paper is divided into multiple zones in the cross-machine direction.
Figure 3:
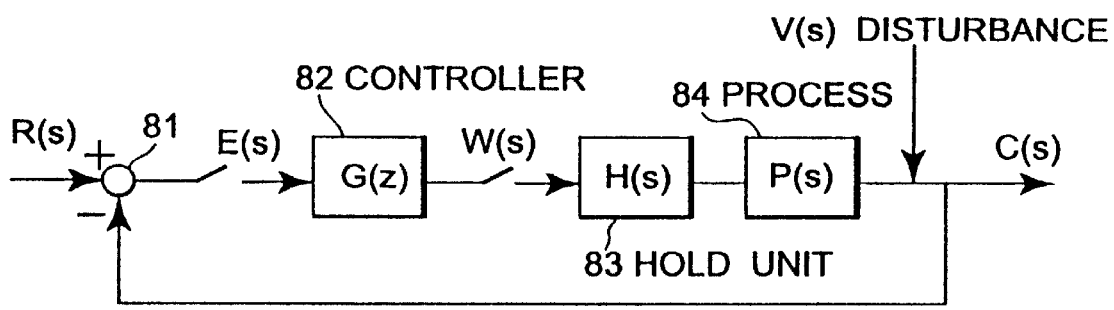
FIG. 3 is a block diagram showing the configuration of a prior art paper machine.

In a first step, the time-series data of an actuator-specific profile is acquired. An actuator-specific profile refers to time-series data on the representative data points of respective zones discussed in FIG. 2. The width of paper is divided into five zones, for example, in the cross-machine direction, and time-series data is acquired for the representative data points of those respective zones. The control gain K* can be set individually for each of these zones. This feature is included in order to cope with the case that the amplitude of disturbance caused, for example, by an eccentricity in a roll varies in the cross-machine direction.

The time-series data may be thought of as representing a chronological change in the profile of a given zone. Now let us assume that the acquired time-series data of an actuator-specific profile is $$Tr(i)(i=0, 1, \ldots, M-1)$$

where M is the number of data items. If M=240, for example, two hours' worth of data can be stored, assuming one scan takes 30 seconds.

As a matter of fact, time-series data exists for each individual zone. To simplify the explanation, note that hereinafter no distinction is made between zones. Also note that the method is designed to always store the most-recent of these data items; if the given data storage area becomes full, earlier data items that cannot be accommodated in the area are discarded automatically.

In a second step, the method judges whether or not the predetermined length of time (e.g., 30 minutes) has elapsed. If not, the method returns to the task of acquiring time-series data. This means that subsequent actions are taken at a given interval.

In a third step, the method performs a frequency analysis on the time-series data Tr(i) of an actuator-specific profile when the predetermined length of time expires. More specifically, the method executes a discrete Fourier transform (DFT) on the time-series data Tr(i) (i=0, 1, ..., M−1). As a result, a frequency component contained in the time-series data Tr(i) (i=0, 1, ..., M−1) is identified.

The discrete Fourier transform is performed in the following manner: Firstly, coefficients A(j) and B(j) are calculated from equations (19) and (20) shown below.

$$A(j) = \sum_{i=0}^{M-1} Tr(i)\cos\left(\frac{2\pi i}{j}\right) \quad (19)$$

$$B(j) = \sum_{i=0}^{M-1} Tr(i)\sin\left(\frac{2\pi i}{j}\right) \quad (20)$$

Then, the amplitude of cyclic disturbance is determined from equation (21) below.

$$Fr(j) = \frac{1}{M}\sqrt{A(j)^2 + B(j)^2} \quad (j = 2, \cdots, M) \quad (21)$$

Fr(j) denotes the amplitude of cyclic disturbance with a period of j×T, where T is a scan time taken for the sensor to make a one-way travel in the cross-machine direction and a value of, for example, 30 seconds is used.

In a fourth step, the method calculates the rate of change in the frequency transfer function against the control gain based on the current control parameters, and then performs a frequency analysis. Now let us define df(j) as $$df(j) = -\{RA \cdot RB + IA \cdot IB + (g-1)(RB^2 + IB^2)\} \quad (22)$$

where $$RA = 1 - \alpha\cos(W(j) \cdot T)$$

$$IA = \alpha\sin(W(j) \cdot T)$$

$$RB = \frac{(1-\alpha)}{(1-\alpha^k)}\{\cos((m+1)W(j) \cdot T) - \alpha^k\cos((k+m+1)W(j) \cdot T)\}$$

$$IB = \frac{(1-\alpha)}{(1-\alpha^k)}\{-\sin((m+1)W(j) \cdot T) + \alpha^k\sin((k+m+1)W(j) \cdot T)\}$$

In the above-noted equations, T is a scan time, g is a control gain ratio, and W(j) is an angular frequency, and the following relationships hold true.

$$g = \frac{K}{K^*} (K = \text{process gain}; K^* = \text{control gain})$$

$$W(j) = \frac{2\pi}{T \cdot j} : \text{angular frequency } (j = 2, \ldots, M)$$

Also in these equations, α is a value used in equation (5) noted earlier, m is a natural number defined by the equation "dead time L=mT," and k is a settling time related parameter applied to the controller G(s) of finite settling-time response control type expressed by equation (6) discussed earlier.

If we define the frequency transfer function as $\Phi_g(e^{jW(j)T})$, we obtain (from equation (18))

$$\frac{\partial |\Phi_g(e^{jW(j)T})|^2}{\partial g} = 2 \cdot |\Phi_g(e^{jW(j)T})|^2 df(j)$$

Thus, the sign of the rate of change in the amplitude of the frequency transfer function in relation to the control gain ratio g agrees with the sign of df(j).

Figure 6:
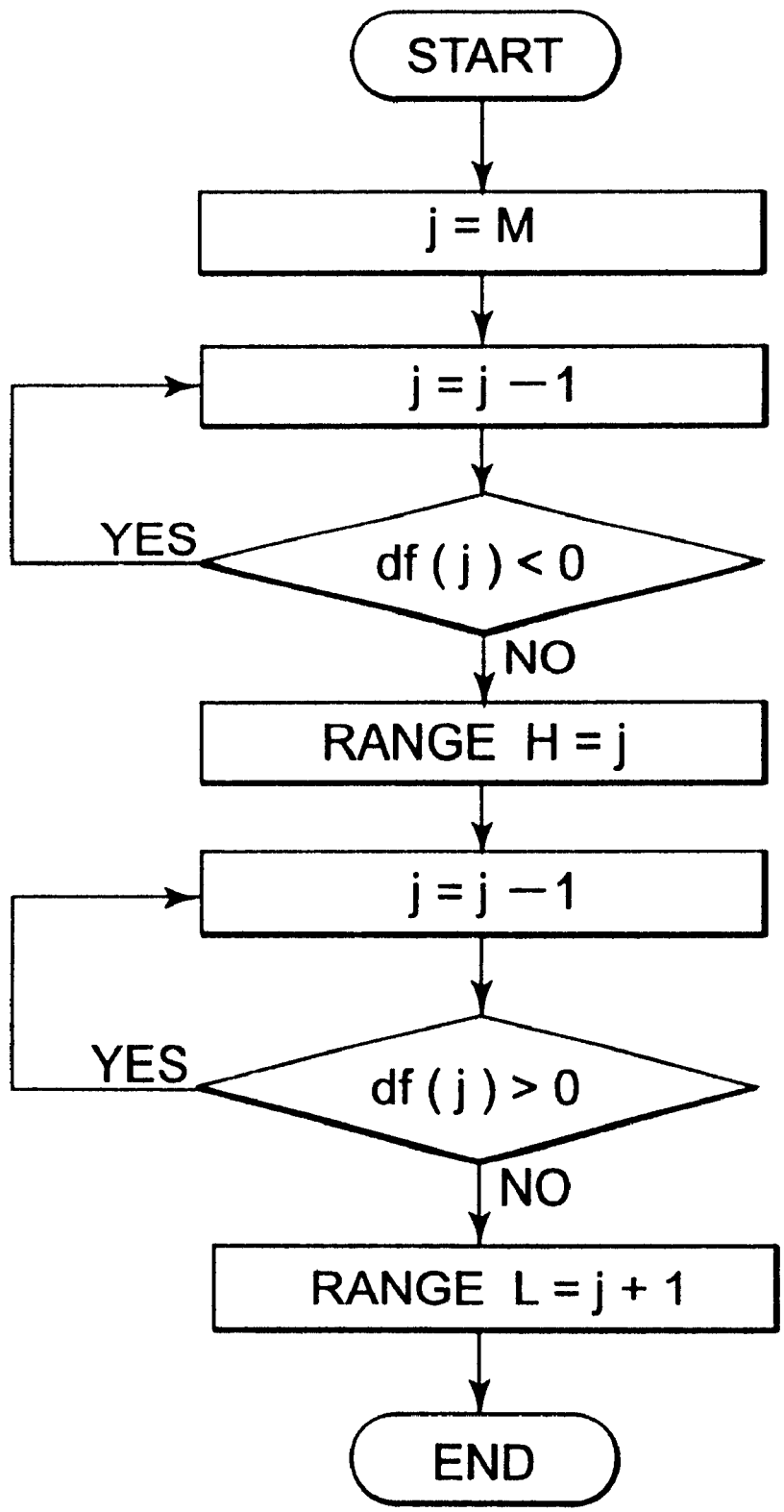
FIG. 6 is a flowchart for explaining an algorithm used to search for a period of disturbance in which the rate of change becomes positive.

In a fifth step, the sign of df(j) is examined. The following explains how to examine the sign, in order to search for the range of the variable j within which df(j) is positive. FIG. 6 is a flowchart showing the procedure of searching for the range. Initially, we assume that j=M, where M is the number of time-series data items. Next, we subtract 1 from j and calculate df(j) to examine the sign thereof. This process is repeated until df(j) equals zero (0) or becomes positive, and the value of j at that point is stored in the parameter RangeH. We once again begin the process of subtracting 1 from j and calculate df(j) to examine the sign thereof, as long as df(j) remains positive. Then, the value of j immediately before df(j) equals zero (0) or becomes negative is stored in the parameter RangeL and the process is terminated. As a result, df(j) is positive for any value of j that satisfies RangeL≦j≦RangeH. Taking the example of FIG. 9, RangeH=40 and RangeL=10 for the case of g=0.6, i.e., control gain K*=1.67.

Figure 7:
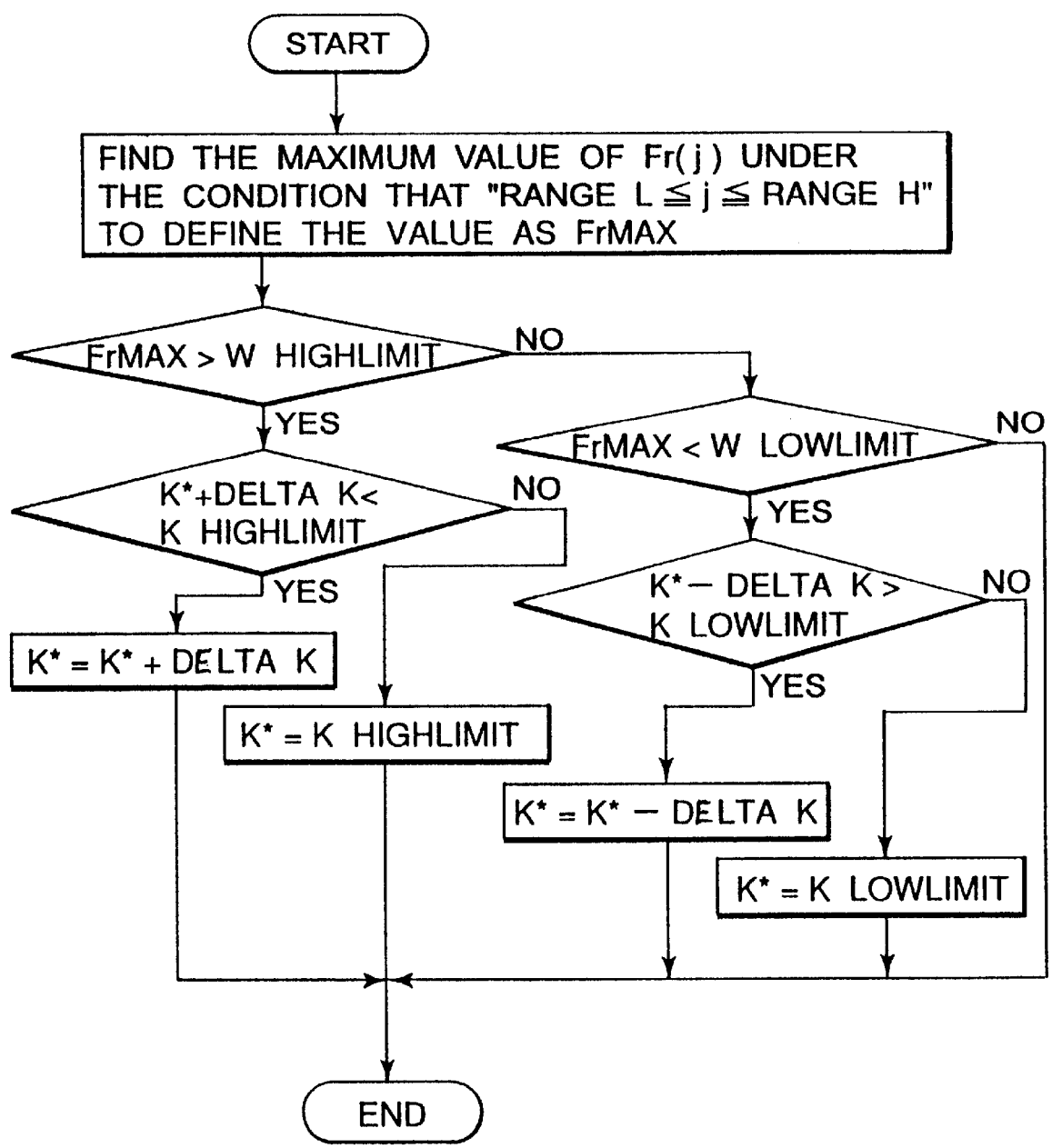
FIG. 7 is a flowchart for explaining an algorithm used to optimize a control gain.

In a sixth step, the control gain is optimized. FIG. 7 is a flowchart showing the algorithm of this optimization. From FIG. 4, it is understood that a cyclic disturbance that satisfies RangeL≦j≦RangeH is the major cause of deterioration in controllability. To cope with this problem, the algorithm is designed so that:

if the maximum amplitude (FrMAX) of cyclic disturbance satisfying the above-noted range is above its upper limit, then the control gain K* is increased by as much as a specific value DeltaK to loosen control; or if the FrMAX is below its lower limit, then the control gain K* is decreased by as much as the specific value DeltaK to tighten control.

For reasons of safety, however, upper and lower limits (KHighLimit and KLowLimit) are placed on the control gain K*.

In the algorithm, Fr(j) defined by equation 21 is calculated for the range of j which is determined from the flowchart of FIG. 6 and within which df(j) is positive. The maximum of the values of Fr(j) thus calculated is defined as FrMAX. Then, FrMAX is compared with the predetermined upper limit WHighLimit and lower limit WLowLimit.

First, comparison is made between FrMAX and WHighLimit. If FrMAX is greater, either a value obtained by adding the predetermined increment DeltaK to the control gain K* or the upper limit KHighLimit, whichever is smaller, is specified as the latest control gain K*. In other words, the control gain K* is increased within the upper limit KHighLimit, in order to loosen control.

If FrMAX is smaller than WHighLimit, comparison is made between FrMAX and WLowLimit. Then, if FrMAX is smaller, either a value obtained by subtracting the predetermined increment DeltaK from the control gain K* or the lower limit KLowLimit, whichever is greater, is specified as the latest control gain K*. In other words, the control gain K* is decreased within the lower limit KLowLimit, in order to tighten control. By executing this algorithm, it is possible to always set the optimum control gain K*. Note here that the parameters KHighLimit and KLowLimit are not always required.

Figure 8:
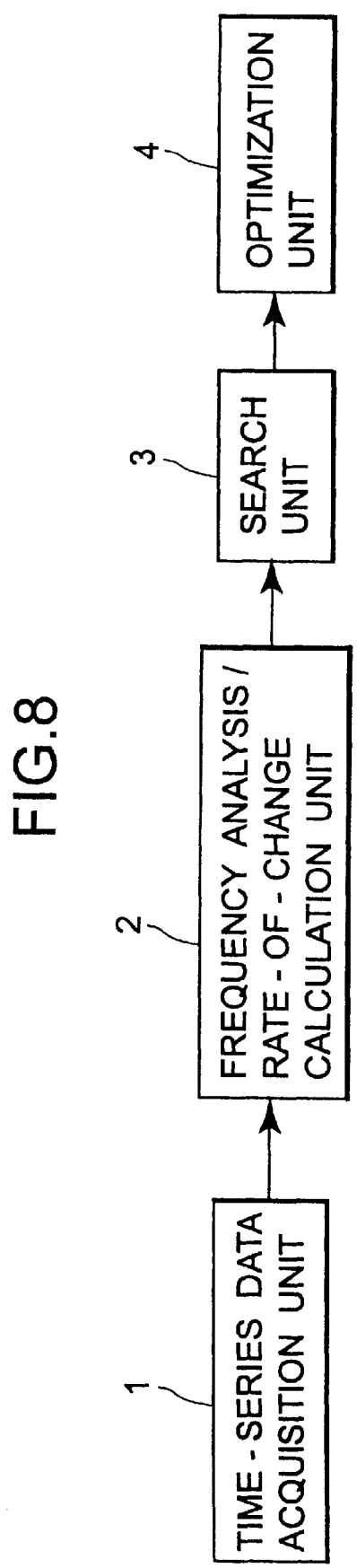
FIG. 8 is a block diagram showing one embodiment of the adaptive control system according to the present invention.

FIG. 8 is a block diagram showing one embodiment of the adaptive control system according to the present invention.

In the figure, a numeral 1 indicates a time-series data acquisition unit for acquiring time-series data on the representative data points of respective zones. The time-series data acquisition unit 1 retains a predetermined number of data items and always keeps them up to date.

A numeral 2 indicates a frequency analysis/rate-of-change calculation unit. The frequency analysis/rate-of-change calculation unit 2 performs a discrete Fourier transform on time-series data acquired by the time-series data acquisition unit 1 to calculate the rate of change df(j) according to equation 22 noted earlier. A numeral 3 denotes a search unit for finding the range of j for which df(j)>0 holds true, according to the flowchart of FIG. 6. A numeral 4 denotes an optimization unit for evaluating the control gain K* according to the flowchart of FIG. 7. Since the behavior of each of these units has already been explained in detail, no further explanation will be made.

FIG. 10 is a graphical view showing the results of control according to the embodiment discussed above. Pictures indicated by ① to ④ in this figure show the results of measuring the profile of a nozzle over a period of 128 minutes. These profiles are arranged in chronological order. The upper graph of each picture indicated by 51 shows the way the paper thickness varies, i.e. a graphical representation of the time-series data of an actuator specific profile. The vertical axis denotes paper thickness and is given a scale range of ±5 μm.

The lower graph indicated by 52 in the same picture is the result of frequency analyzing the time-series data. The horizontal axis of the graph denotes the period of disturbance. In the graph, each period component within the disturbance period range from 2 to 43 minutes is represented by a bar. As the result of exploring the period of distrubance, it is already known that the amplitude of disturbance increases as the control gain is decreased (control is tightened) for disturbances with a period from 8 to 33 minutes. This range of periods is indicated by a lower horizontal line segment 53 and an upper horizontal line segment 54. "Gain" refers to the control gain K*, "upper amplitude limit" refers to WHighLimit, "lower amplitude limit" refers to WLowLimit, and "maximum amplitude" refers to FrMAX. In addition, DeltaK=0.01 in this case.

The relationship FrMAX>WHighLimit holds true in the profiles of pictures ① to ③ in FIG. 10, indicating that the system is interfered with to a considerable extent. For this reason, the control gain is increased from 0.21 to 0.29 as the result of optimization control. At a later time, however, the process under control has become stable for some reason. When the profile of picture ④ is measured, the relationship between the maximum amplitude and the lower amplitude limit is FrMAX<WLowLimit. As a result, the control gain has been decreased to 0.22.

As discussed in the above-described embodiment, the control gain is optimized automatically according to the condition of disturbance to the process. Consequently, process control remains stable no matter what sort of disturbance enters the system. In addition, it is understood that the algorithm used in this embodiment is designed so that the control gain K* is varied automatically within the limit of approximately 1.5 times the value thereof according to the condition of disturbance.

Although finite settling-time response control has been described in the explanation of the above-described embodiment, the present invention is not limited to this type of control. Also in the case of sampling PI control, required computational expressions can be derived in the same way as discussed above.

Furthermore, although profile control in the cross-machine direction of a paper machine has been described in the above-described embodiment, the embodiment can also be applied to standard sampling control systems.

What is claimed is:

1. An adaptive control method for controlling a process by calculating a manipulated variable from a deviation between a setpoint variable and a control output variable and then using said manipulated variable, said method comprising the steps of:

performing frequency analysis on time series data of said control output variable;

determining a range of periods within which either rate of change in frequency response amplitude of said control output variable in relation to a control gain ratio or a substantive function, is positive, wherein said substantive function is a function of frequency and whose sign is same as that of said rate of change; and increasing control gain by a given value when maximum value of an amplitude obtained by decomposing said time series data within said range of periods into frequency components is larger than a first value, or decreasing said control gain by a given value when said maximum value is smaller than a second value.

2. The method of claim 1, wherein increase and decrease in said control gain are manipulated so that said control gain falls within predetermined limits.

3. The method of claim 1, wherein said method is applied to control profile in a cross machine direction of a paper making machine.

4. The method of claim 1, wherein discrete Fourier transform is applied in order to decompose said time series data into said frequency components.

5. The method of claim 1, wherein said substantive function df(j) is expressed as follows:

$$df(j)=-\{RA \cdot RB+IA \cdot IB+(g-1)(RB^2+IB^2)\}$$

where $$RA = 1 - \alpha\cos(W(j) \cdot T)$$

$$IA = \alpha\sin(W(j) \cdot T)$$

$$RB = \frac{(1-\alpha)}{(1-\alpha^k)}\{\cos((m+1)W(j) \cdot T) - \alpha^k\cos((k+m+1)W(j) \cdot T)\}$$

$$IB = \frac{(1-\alpha)}{(1-\alpha^k)}\{-\sin((m+1)W(j) \cdot T) + \alpha^k\sin((k+m+1)W(j) \cdot T)\}.$$

6. The method of claim 1, wherein said first value is within the range of from 0.3 to 0.4; and wherein said second value is within the range of from 0.1 to 0.2.

7. An adaptive control method for controlling a process by calculating a manipulated variable from a deviation between a setpoint variable and a control output variable and then using said manipulated variable, said method comprising the steps of:

performing frequency analysis on time series data of said control output variable;

determining a range of periods within which rate of change in frequency response amplitude of said control output variable in relation to gain ratio is positive; and increasing control gain by a given value when maximum value of an amplitude obtained by decomposing said time series data within said range of periods into frequency components is larger than a first value, or decreasing said control gain by a given value when said maximum value is smaller than a second value.

8. The method of claim 7, wherein increase and decrease in said control gain are manipulated so that said control gain falls within predetermined limits.

9. The method of claim 7, wherein said method is applied to control profile in a cross machine direction of a paper making machine.

10. The method of claim 7, wherein discrete Fourier transform is applied in order to decompose said time series data into said frequency components.

11. The method of claim 7, wherein said first value is within the range of from 0.3 to 0.4; and wherein said second value is within the range of from 0.1 to 0.2.

12. An adaptive control method for controlling a process by calculating a manipulated variable from a deviation between a setpoint variable and a control output variable and then using said manipulated variable, said method comprising the steps of:

performing frequency analysis on time series data of said control output variable;

determining a range of periods within which a substantive function is positive, wherein said substantive function is a function of frequency and whose sign is same as that of said rate of change; and increasing control gain by a given value when maximum value of an amplitude obtained by decomposing said time series data within said range of periods into frequency components is larger than a first value, or decreasing said control gain by a given value when said maximum value is smaller than a second value.

13. The method of claim 12, wherein increase and decrease in said control gain are manipulated so that said control gain falls within predetermined limits.

14. The method of claim 12, wherein said method is applied to control profile in a cross machine direction of a paper making machine.

15. The method of claim 12, wherein discrete Fourier transform is applied in order to decompose said time series data into frequency components.

16. The method of claim 12, wherein said first value is within the range of from 0.3 to 0.4; and wherein said second value is within the range of from 0.1 to 0.2.

17. An adaptive control apparatus for controlling a process by calculating a manipulated variable from a deviation between a setpoint variable and a control output variable and then using said manipulated variable, said apparatus comprising:

means for performing frequency analysis on time series data of said control output variable;

means for determining a range of periods within which either rate of change in frequency response amplitude of said control output variable in relation to a control gain ratio or a substantive function, is positive, wherein said substantive function is a function of frequency and whose sign is same as that of said rate of change; and means for increasing control gain by a given value when maximum value of an amplitude obtained by decomposing said time series data within said range of periods into frequency components is larger than a first value, or decreasing said control gain by a given value when said maximum value is smaller than a second value.

18. The apparatus of claim 17, further comprising means for manipulating increase and decrease in said control gain so that said control gain falls within predetermined limits.

19. The apparatus of claim 17, wherein said apparatus is used to control profile in a cross machine direction of a paper making machine.

20. The apparatus of claim 17, wherein said means for performing comprises means for applying discrete Fourier transform in order to decompose said time series data into said frequency components.

21. The apparatus of claim 17, wherein said substantive function df(j) is expressed as follows:

$$df(j)=-\{RA \cdot RB+IA \cdot IB+(g-1)(RB^2+IB^2)\}$$

where $$RA = 1 - \alpha\cos(W(j) \cdot T)$$

$$IA = \alpha\sin(W(j) \cdot T)$$

$$RB = \frac{(1-\alpha)}{(1-\alpha^k)}\{\cos((m+1)W(j) \cdot T) - \alpha^k\cos((k+m+1)W(j) \cdot T)\}$$

$$IB = \frac{(1-\alpha)}{(1-\alpha^k)}\{-\sin((m+1)W(j) \cdot T) + \alpha^k\sin((k+m+1)W(j) \cdot T)\}.$$

22. The apparatus of claim 17, wherein said first value is within the range of from 0.3 to 0.4; and wherein said second value is within the range of from 0.1 to 0.2.

* * * * *